United States Patent
Pischow

(10) Patent No.: US 10,598,408 B2
(45) Date of Patent: Mar. 24, 2020

(54) SOLAR THERMAL ABSORBER ELEMENT

(71) Applicant: SAVO-SOLAR OY, Mikkeli (FI)

(72) Inventor: Kaj A. Pischow, Mikkeli (FI)

(73) Assignee: SAVO-SOLAR OY, Mikkeli (FI)

( * ) Notice: Subject to any disclaimer, the term of this patent is extended or adjusted under 35 U.S.C. 154(b) by 1222 days.

(21) Appl. No.: 14/616,782

(22) Filed: Feb. 9, 2015

(65) Prior Publication Data
US 2015/0233606 A1    Aug. 20, 2015

(30) Foreign Application Priority Data

Feb. 17, 2014  (FI) ...................................... 20145153

(51) Int. Cl.
| | | |
|---|---|---|
| *F24S 80/70* | (2018.01) | |
| *F24S 10/40* | (2018.01) | |
| *F24S 70/20* | (2018.01) | |
| *F24S 80/54* | (2018.01) | |
| *F24S 10/50* | (2018.01) | |
| *F25B 27/00* | (2006.01) | |
| *F24S 80/56* | (2018.01) | |

(52) U.S. Cl.
CPC .............. *F24S 10/40* (2018.05); *F24S 10/506* (2018.05); *F24S 70/20* (2018.05); *F24S 80/54* (2018.05); *F24S 80/70* (2018.05); *F25B 27/002* (2013.01); *F24S 80/56* (2018.05); *Y02E 10/44* (2013.01)

(58) Field of Classification Search
CPC .... F24J 2/485; F24J 2/465; F24J 2/204; F24J 2/464; F24J 2/208; F24J 2002/5275
See application file for complete search history.

(56) References Cited

U.S. PATENT DOCUMENTS

| | | | | |
|---|---|---|---|---|
| 3,000,375 A | * | 9/1961 | Golay | F24S 70/25 126/569 |
| 3,974,822 A | * | 8/1976 | Patil | F24S 40/40 126/708 |
| 3,981,293 A | * | 9/1976 | Gillery | C03C 17/23 126/648 |
| 4,026,272 A | * | 5/1977 | Bottum | F24S 80/525 126/661 |

(Continued)

FOREIGN PATENT DOCUMENTS

| | | |
|---|---|---|
| CH | 612747 | 8/1979 |
| CN | 102775944 | 11/2012 |

(Continued)

OTHER PUBLICATIONS

JP 2012015190 A—English machine translation.*

(Continued)

*Primary Examiner* — Jorge A Pereiro
(74) *Attorney, Agent, or Firm* — Young & Thompson

(57) ABSTRACT

A solar thermal absorber element (100) includes a cover glass (110) and a highly selective vacuum coated roll-bond absorber (120) including heat transport tubes (126). The element further including a thermoplastic sealing (130) configured to attach the cover glass and the roll-bond absorber to each other so that there is a distance (h) between the cover glass and the roll-bond absorber, and a sealed space (134), which is formed by the cover glass, the roll-bond absorber, and the thermoplastic sealing and which is filled up with a low thermal conductive gas (136).

18 Claims, 1 Drawing Sheet

(56) References Cited

U.S. PATENT DOCUMENTS

| | | | |
|---|---|---|---|
| 4,084,580 A * | 4/1978 | Roark | F24S 10/30 126/646 |
| 4,132,219 A * | 1/1979 | Cohen | F24S 20/20 126/694 |
| 4,261,330 A | 4/1981 | Reinisch | |
| 4,274,395 A * | 6/1981 | Bangs | F24S 80/50 126/634 |
| 4,277,537 A * | 7/1981 | Woodman | C09D 5/32 428/409 |
| 4,333,789 A | 6/1982 | McAlister | |
| 4,337,756 A * | 7/1982 | Serapioni | F24S 10/25 126/629 |
| 4,446,853 A * | 5/1984 | Adcock | F24F 5/0046 126/707 |
| 4,493,940 A * | 1/1985 | Takaoka | F24J 2/268 126/570 |
| 4,724,826 A | 2/1988 | Muramatsu | |
| 4,803,972 A * | 2/1989 | Janson | F24S 80/50 126/710 |
| 6,231,974 B1 | 5/2001 | Yamakawa et al. | |
| 6,420,002 B1 * | 7/2002 | Aggas | E06B 3/6612 428/34 |
| 7,585,568 B2 * | 9/2009 | Barshilia | C23C 14/568 428/446 |
| 7,817,328 B2 * | 10/2010 | Millett | C09K 9/02 359/265 |
| 8,154,788 B2 * | 4/2012 | Millett | C09K 9/02 359/265 |
| 9,513,032 B2 * | 12/2016 | Pischow | F24S 70/20 |
| 2003/0010378 A1 * | 1/2003 | Yoda | B32B 17/10055 136/251 |
| 2007/0196670 A1 * | 8/2007 | Barshilia | C23C 14/568 428/446 |
| 2008/0047548 A1 * | 2/2008 | Konietzny | C03C 25/26 126/709 |
| 2008/0092456 A1 * | 4/2008 | Millett | C09K 9/02 52/1 |
| 2008/0245011 A1 * | 10/2008 | Friedl | E06B 3/6612 52/407.5 |
| 2009/0194156 A1 * | 8/2009 | Grommesh | H01L 31/048 136/256 |
| 2009/0320921 A1 * | 12/2009 | Grommesh | E06B 3/66304 136/256 |
| 2010/0031998 A1 * | 2/2010 | Aguglia | H02S 40/44 136/244 |
| 2010/0035034 A1 * | 2/2010 | Yin | C23C 14/0676 428/216 |
| 2010/0147290 A1 * | 6/2010 | Kunczynski | F24S 10/502 126/667 |
| 2010/0243055 A1 * | 9/2010 | Yoneya | H01G 9/2031 136/259 |
| 2010/0313875 A1 * | 12/2010 | Kennedy | F24S 10/45 126/652 |
| 2011/0062724 A1 * | 3/2011 | Sines | F03G 7/04 290/1 R |
| 2011/0075244 A1 * | 3/2011 | Millett | C09K 9/02 359/288 |
| 2011/0192393 A1 * | 8/2011 | Swift | F24S 10/72 126/663 |
| 2011/0220097 A1 * | 9/2011 | Ventelon | F24S 23/82 126/684 |
| 2011/0226334 A1 * | 9/2011 | Lamb | C09J 123/22 136/259 |
| 2012/0031465 A1 * | 2/2012 | Battistutti | H01L 31/048 136/246 |
| 2012/0160233 A1 * | 6/2012 | Yuan | F24S 10/506 126/674 |
| 2013/0061846 A1 * | 3/2013 | Colson | F24S 60/00 126/617 |
| 2013/0125876 A1 * | 5/2013 | Andritschky | C23C 14/0036 126/676 |
| 2013/0161942 A1 * | 6/2013 | Balbo Di Vinadio | F16L 41/08 285/125.1 |
| 2013/0192588 A1 * | 8/2013 | Ostermann | C25D 7/00 126/676 |
| 2014/0026885 A1 | 1/2014 | Aiso et al. | |
| 2014/0048059 A1 * | 2/2014 | Andritschky | C23C 14/022 126/676 |
| 2014/0087099 A1 * | 3/2014 | Veerasamy | E06B 3/6775 428/34 |
| 2014/0090687 A1 * | 4/2014 | Den Boer | H02S 20/26 136/246 |
| 2014/0224243 A1 * | 8/2014 | Pischow | F24S 70/20 126/674 |
| 2014/0305496 A1 * | 10/2014 | Nam | H01L 31/048 136/251 |
| 2014/0329073 A1 * | 11/2014 | Barshilia | C23C 14/021 428/216 |

FOREIGN PATENT DOCUMENTS

| | | | |
|---|---|---|---|
| DE | 9301018 | 3/1993 | |
| DE | 10161085 | 6/2003 | |
| DE | 202005019500 | 3/2006 | |
| DE | 102008064010 | 7/2010 | |
| DE | 102008064010 A1 * | 7/2010 | F24S 10/504 |
| EP | 0070981 A1 | 2/1983 | |
| EP | 0229037 A2 | 7/1987 | |
| EP | 2351975 A1 | 8/2011 | |
| FR | 2363775 | 3/1978 | |
| GB | 938012 | 9/1963 | |
| JP | S63-280600 A | 11/1988 | |
| JP | H08-091881 A | 4/1996 | |
| JP | H11-35893 A | 2/1999 | |
| JP | 2012015190 A * | 1/2012 | |
| WO | 2011135152 A1 | 11/2011 | |
| WO | 2012/113968 | 8/2012 | |

OTHER PUBLICATIONS

DE-102008064010-A1—English machine translation (Year: 2010).*
International Search Report, dated Sep. 22, 2014, from corresponding PCT application.
Chinese Office Action dated Feb. 5, 2016 in corresponding Chinese Patent Application No. 201510172116.8 with English translation of Chinese Office Action.
Japanese Office Action for Application No. 2015-027463 dated Nov. 5, 2019, with English translation provided.
European Search Report for Application No. 15153606, dated May 27, 2015.
European Search Report for Application No. 15153606, dated Jun. 12, 2018.
Japanese Office Action for Application No. 2015-027463 dated Jan. 29, 2019, with English translation provided.

* cited by examiner

SOLAR THERMAL ABSORBER ELEMENT

TECHNICAL FIELD

The application relates generally to a solar thermal absorber element.

BACKGROUND

Existing solar thermal collectors are manufactured by mounting a heat insulation and a solar thermal absorber, which has heat transport tubes, inside a collector frame one on the other at a time, and fixing a transparent cover to the frame. A structure of an existing collector enables an ambient air to flow through the collector structure and to dry the inner parts of the collector.

However, the existing collectors enable sand, salt, and insects to invade inside its structure along the flowing air, which cause damages decreasing a lifetime and an efficiency of the collectors.

In addition, the existing collectors suffer big heat losses because of the ventilated structure.

In addition, the existing collectors suffer moisture condensation and condensation of other evaporated components from the insulation on an inner surface of the cover, which decrease an operation time of the collectors.

The preceding drawbacks have limited significantly the usability of the existing collectors.

SUMMARY

Therefore, one object of the invention is to withdraw the above-mentioned drawbacks and provide an efficient and cost effective solar thermal absorber element.

One object of the invention is fulfilled by providing a solar thermal absorber element, a solar thermal collector, and a heating system.

According to one embodiment of the invention, a solar thermal absorber element comprising a cover glass and a highly selective vacuum coated roll-bond absorber comprising heat transport tubes, a thermoplastic sealing configured to attach the cover glass and the roll-bond absorber to each other so that there is a distance between the cover glass and the roll-bond absorber, and a sealed space, which is formed by the cover glass, the roll-bond absorber, and the thermoplastic sealing and which is filled up with a low thermal conductive gas.

The term "highly selective vacuum coating" refers to e.g. a coating, which is deposited in vacuum and which form a selective absorber coating with a a solar absorbance more than 96% with low thermal emission by radiation in the infrared.

The term "roll-bond absorber" refers to an absorber, which comprises at least one tube and which is provided by a roll-bond technology.

The term "thermoplastic sealing" refers to a sealing, which is made by a thermoplastic sealing (TPS) technology.

The term "low thermal conductive gas" refers to e.g. a gas, which has a low thermal conductivity, e.g. noble gases. A low thermal conductive can be e.g. argon, krypton, or xenon.

According to one embodiment of the invention, a solar thermal collector comprising a solar thermal absorber element comprising a cover glass and a highly selective vacuum coated roll-bond absorber comprising heat transport tubes. The element further comprising a thermoplastic sealing configured to attach the cover glass and the roll-bond absorber to each other so that there is a distance between the cover glass and the roll-bond absorber, and a sealed space, which is formed by the cover glass, the roll-bond absorber, and the thermoplastic sealing and which is filled up with a low thermal conductive gas.

According to one embodiment of the invention, a heating system comprising a solar thermal absorber element, which comprises a cover glass and a highly selective vacuum coated roll-bond absorber comprising heat transport tubes. The element further comprising a thermoplastic sealing configured to attach the cover glass and the roll-bond absorber to each other so that there is a distance between the cover glass and the roll-bond absorber, and a sealed space, which is formed by the cover glass, the roll-bond absorber, and the thermoplastic sealing and which is filled up with a low thermal conductive gas. The system further comprising a heat pump connected to the solar thermal absorber element.

Further embodiments of the invention are defined in dependent claims.

The verb "to comprise" is used in this document as an open limitation that neither excludes nor requires the existence of also unrecited features. The verbs "to include" and "to have/has" are defined as to comprise.

The terms "a", "an" and "at least one", as used herein, are defined as one or more than one and the term "plurality" is defined as two or more than two.

The term "another", as used herein, is defined as at least a second or more.

The term "or" is generally employed in its sense comprising "and/or" unless the content clearly dictates otherwise.

For the above-mentioned defined verbs and terms, these definitions shall be applied, unless a different definition is given in the claims or elsewhere in this description/specification.

Finally, the features recited in depending claims are mutually freely combinable unless otherwise explicitly stated.

BRIEF DESCRIPTION OF THE FIGURES

The embodiments of the invention will be described with reference to the accompanying figures, in which.

DETAILED DESCRIPTION OF THE FIGURES

Figure 1:
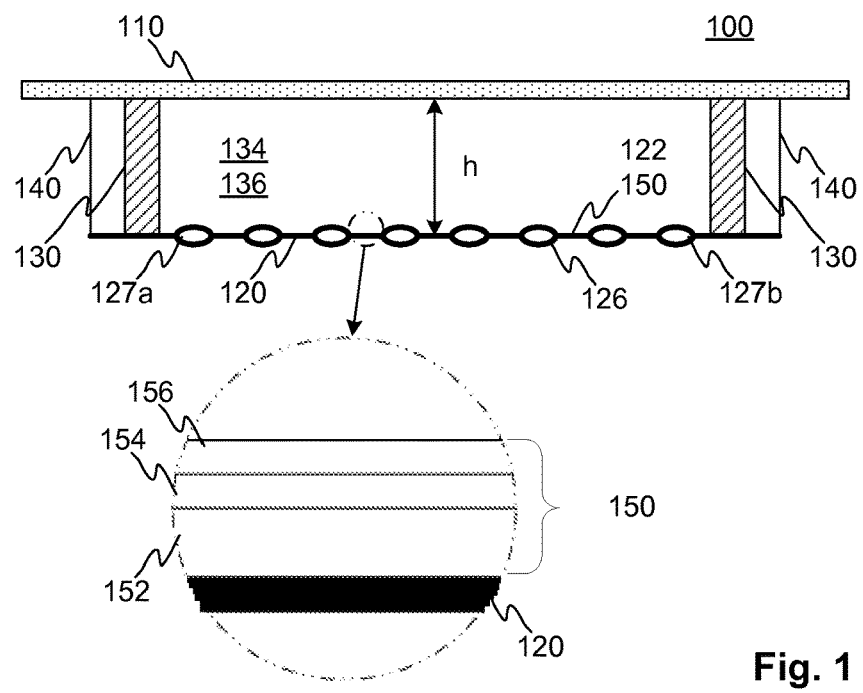
FIG. 1 illustrates a cross-section of a solar thermal absorber element.

FIG. 1 illustrates a cross-section of a solar thermal absorber element (module) 100.

The element 100 comprising a highly transparent cover glass 110, which allows solar radiation to pass to a roll-bond absorber 120 and at the same time covers the highly selective vacuum coated absorber 120 for mechanical damages, insects and dust. In addition, the glass 110 reduces heat losses from the absorber 120.

The absorber 120 is configured to absorb the solar radiation. The absorber 120 comprising at least one heat transport tube 126 and it is formed by means of a roll-bond technology, where two e.g. aluminium plates are bonded together by a rolling process. A pattern and size of the tube(s) 126 are printed on an inner surface of one plate by a special silk screen and ink. The printed pattern remains between inner surfaces of the bonded plates and after the bonding, the tube(s) 126 is formed by inflating compressed air through the printed pattern.

The tube(s) 126 forms a continuous heat transport channel, which has an inlet 127a and an outlet 127b and which is configured to circulate a heat transport fluid, e.g. water, air, or antifreeze, inside the absorber 120. A design of tube(s) 126 can be designed e.g. as a single twisting tube 126 and/or a multibranched tube 126, which is configured to decrease a flow resistant of the heat transport fluid.

The inlet 127a and the outlet 127b are configured to be connected to external devices, e.g. a tubing of a solar thermal collector or its adapter means.

The rigid absorber 120 keeps a distance h between the glass 110 and the absorber 120 constant—prevents the absorber 120 to bend towards the glass 110—in order to minimize thermal losses. The thermal losses are minimized when the distance h is 10 mm. If the absorber 120 bends towards the glass 110 so that the distance h is less than 10 mm, the thermal losses increase dramatically.

The absorber 120 comprises a highly selective vacuum coating 150, e.g. a so-called MEMO coating comprising ceramic layers based on silicon, aluminium, and titanium, on a front surface 122 of the absorber 120. The coating 150, which comprises layers 152, 154, 156, is deposited in vacuum on an entire and complete absorber 120 at once by means of a physical vapour deposition (PVD) process and/or a plasma-enhanced chemical vapour deposition (PECVD) process.

A first layer 152 on the front surface 122 is configured to absorb light and to prevent a diffusion of elements from the absorber material, which decreases a performance of the absorber 120. The layer 152 has composition comprising titanium, aluminium, nitrogen, and one of following elements: silicon, yttrium, cerium, and chromium.

The layer 152 can have e.g. a layer thickness between 10 nm-600 nm and it can comprise e.g. titanium, aluminium, silicon, and nitrogen $(Ti_xAl_ySi_z)N_a$. Alternatively, yttrium, cerium, and/or chromium can be used additionally or instead of silicon.

Indices x, y, z, and a, and later on also index b indicate a stoichiometric or non-stoichiometric composition of the layers 152, 154, 156.

The values of the layer 152 for x, y, z, and a can be e.g. 0.4, 0.5, 0.1, and 1.0 respectively. Typically, a value of x is 0.3-0.5, value of y 0.3-0.6, value of z 0.03-0.2, and value of a 0.9-1.1.

A second intermediate layer 154 on the layer 152 is configured to absorb light and to increase an interference at selected wavelengths. The layer 154 has composition comprising titanium, aluminium, nitrogen, oxygen, and one of following elements: silicon, yttrium, cerium, and chromium.

The layer 154 can have e.g. a layer thickness between 10 nm-150 nm and it can comprise titanium, aluminium, silicon, nitrogen, and oxygen $(Ti_xAl_ySi_z)N_aO_b$. Alternatively, yttrium, cerium, and/or chromium can be used additionally or instead of silicon. The values for x, y, z, a, and b can be e.g. 0.4, 0.5, 0.1, 0.8, and 0.3 respectively. Typically, a value of x is 0.3-0.5, value of y 0.3-0.6, value of z 0.03-0.2, value of a 0.2-0.8, and value of b 0.2-0.8.

A third top layer 156 on the second layer 154 is configured to serve as antireflection layer and to isolate the coating 150 from a surrounding gas. It has composition comprising titanium, aluminium, silicon, nitrogen, and oxygen.

The layer 156 can have e.g. a layer thickness between 50 nm-250 nm and it can comprise titanium, aluminium, silicon, nitrogen, and oxygen $(Ti_xAl_ySi_z)N_aO_b$. Typically a value of x is 0-0.2, value of y 0-0.2, value of z 0-1, value of a 0-2, and value of b 0-2.

The element 100 comprising a thermoplastic sealing (spacer) 130, which is configured to attach the glass 110 and the absorber 120 to each other so that there is the certain distance h, e.g. 10, 15, or 20 mm, between the glass 110 and the absorber 120.

The attachment is made by a TPS technology. The sealing 130, e.g. a butyl sealing, is injected on the glass 110 for achieving a desired sealing thickness and the distance h between the glass 110 and the absorber 120. Then, the glass 110 with the sealing 130 and the absorber 120 are pressed together so that it is formed a gas tight (hermetically) sealed space 134, which is surrounded by the glass 110, the absorber 120, and the sealing 130 as the figure illustrates.

At the same time, when the glass 110 and the absorber 120 are pressed together, a low thermal conductive gas 136, e.g. an argon gas, is injected into the space 134 so that it is filled up with the gas 136. The gas 136 reduces thermal losses by convection.

The glass 110, the rigid absorber 120, and the gas tight sealing 130 keep the gas 136 in the space 134 and prevent the gas 136 to flow away from the space 134.

The element 100 further comprising a secondary sealing 140, e. g. a silicone sealing, which is attached to the sealing 130 and between the glass 110 and the absorber 120. The sealing 140 protects the sealing 130 and carries a weight of the absorber 120.

The sealed element 100 prevents dust or insects to let in the element 100, and preserves an efficiency of the absorber 120, when there is no efficiency change during a lifetime of the absorber 120 because of the dust or insects.

In addition, the sealed element 100 prevents a water condensation on the glass 110, whereupon it can start to produce energy earlier on a morning.

The element 100 is possible to assemble to the existing collector frames by the same way as the transparent covers have been fixed until now.

Figure 2:
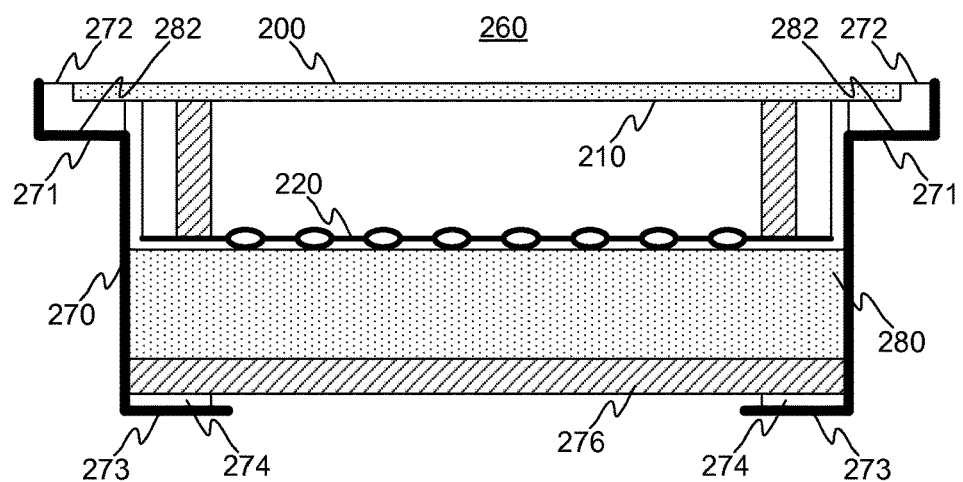
FIG. 2 illustrates a cross-section of a solar thermal collector.

FIG. 2 illustrates a cross-section of a solar thermal collector 260, which comprising the element 200 illustrated in FIG. 1. The collector 260 is a flat plate-type collector e.g. for high temperatures.

The collector 260 comprising a collector frame 270 that covers the collector 260 for mechanical damages, insects, and dust.

The frame 270 comprising at least one support element 272 on its collar part 271 on an inner surface 282 of the frame 270. The support element(s) 272 is configured to support the element 200—especially its glass 210—when the element 200 is mounted into the frame 270.

In addition, the frame 270 comprising at least one support element 274 on a bottom part 273 on the inner surface 282 and a backing plate 276. The support element(s) 274 supports the backing plate 276, which is configured to support a heat insulation 280 of the collector 260 and to cover the collector 260 for the mechanical damages, insects and dust.

The insulation 280 is configured to thermally insulate the element 200 and to minimize an effect of its environment. The insulation 280, e.g. a mineral wool or a wood fiber wool, is mounted on the backing plate 276 as the figure illustrates, whereupon it supports the absorber 220 when element 200 is mounted into the frame 270.

The backing plate 276 can be a part of the insulation 280, whereupon it is also configured to thermally insulate the element 200.

The sealed element 200 prevents the insulation 280 based water condensation on the glass 210 and itenables to use cheaper insulation materials in the collector 260, because there is no condensation of any evaporated components from the insulation 280 on the glass 210.

The mounted element 200 is supported by the support element(s) 272 and the insulation 280, and the tube(s) 126—the heat transport channel—is connected to the collector 260 by means of the inlet 127a and the outlet 127b, and e.g. the adapter means (not illustrated) of the collector 260.

The element 200 is extremely valuable in high temperature flat plate collectors 260, which can be utilized e.g. solar cooling applications. The elements 200 will provide a possibility to build very effective modular large area collectors for process and district heating systems, which are the fastest growing solar thermal application areas.

Figure 3:
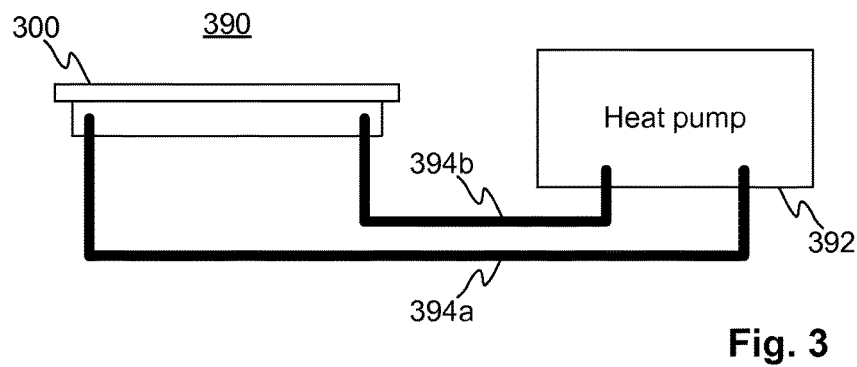
FIG. 3 illustrates a heating system.

FIG. 3 illustrates a heating system 390 for providing thermal energy.

The system 390 comprising the element 300 illustrated in FIG. 1 and a heat pump 392, e.g. a geothermal heatpump, connected to the element 300 by means of e.g. the inlet 127a and the outlet 127b of the element 300, adapter means, and heat transport connections 394a, 394b.

The element 300 provides heat, e.g. it heats a building and its hot water, whenever it is possible. In the autumn, winter, and spring, when there is no sunshine sufficiently, the element 300 improves a performance of the heat pump 392 by preheating heat transport fluid before it flows into the heat pump 392. The preheated fluid increases an efficiency of the heat pump 392 and minimizes a use of heat pump 392 based thermal energy.

In addition, the system 300 can use merely the heat pump 392 for providing the thermal energy.

The invention has been now explained above with reference to the aforesaid embodiments and the several advantages of the invention have been demonstrated. It is clear that the invention is not only restricted to these embodiments, but comprises all possible embodiments within the spirit and scope of the invention thought and the following claims.

The invention claimed is:

1. A solar thermal absorber element comprising:
a cover glass; and
a highly selective vacuum coated roll-bond absorber, a distance being defined between the cover glass and the roll-bond absorber, the roll-bond absorber comprising heat transport tubes,
wherein a thermoplastic sealing attaches the cover glass and the roll-bond absorber to each other so that a hermetically-sealed space is formed, the hermetically-sealed space being surrounded by the cover glass, the roll-bond absorber, and the thermoplastic sealing, the hermetically-sealed space being filled up with a low thermal conductive gas.

2. The element of claim 1, further comprising a secondary sealing, which is attached to the thermoplastic sealing and between the cover glass and the roll-bond absorber such that the secondary sealing protects the thermoplastic sealing and carries a weight of the roll-bond absorber.

3. The element of claim 2, wherein the roll-bond absorber comprises a coating on a front surface of the roll-bond absorber.

4. The element of claim 3, wherein the coating comprises deposited layers including:
a first layer on the roll-bond absorber having a composition comprising titanium, aluminum, nitrogen, and one of following elements: silicon, yttrium, cerium, and chromium,
a second layer on the first layer having a composition comprising titanium, aluminum, nitrogen, oxygen, and one of following elements: silicon, yttrium, cerium, and chromium, and
a third layer on the second layer having a composition comprising titanium, aluminum, silicon, nitrogen, and oxygen.

5. The element of claim 2, wherein the secondary sealing is formed from silicone.

6. The element of claim 1, wherein the roll-bond absorber comprises a coating on a front surface of the roll-bond absorber.

7. The element of claim 6, wherein the coating comprises deposited layers including:
a first layer on the roll-bond absorber having a composition comprising titanium, aluminum, nitrogen, and one of following elements: silicon, yttrium, cerium, and chromium,
a second layer on the first layer having a composition comprising titanium, aluminum, nitrogen, oxygen, and one of following elements: silicon, yttrium, cerium, and chromium, and
a third layer on the second layer having a composition comprising titanium, aluminum, silicon, nitrogen, and oxygen.

8. The element of claim 7, wherein the first layer has a thickness of between 10 nm and 600 nm, the second layer has a thickness between 10 nm and 150 nm and the third layer has a thickness between 50 nm and 250 nm.

9. The element of claim 7, wherein the first layer comprises $(Ti_xAl_ySi_z)N_a$, where x is 0.3-0.5, y is 0.3-0.6, z is 0.03-0.2 and a is 0.9-1.1.

10. The element of claim 7, wherein the second layer comprises $(Ti_xAl_ySi_z)N_aO_b$, where x is 0.3-0.5, y is 0.3-0.6, z is 0.03-0.2, and a is 0.2-0.8 and b is 0.2-0.8.

11. The element of claim 7, wherein the third layer comprises $(Ti_xAl_ySi_z)N_aO_b$, where x is 0-0.2, y is 0-0.2, z is 0-1, and a is 0-2 and b is 0-2.

12. A solar thermal collector comprising:
the solar thermal absorber element of claim 1.

13. A heating system comprising:
the solar thermal absorber element of claim 1; and
a heat pump connected to the solar thermal absorber element.

14. The element of claim 1, wherein the distance between the cover glass and the roll-bond absorber is 10 mm.

15. The element of claim 1, wherein the gas is argon, krypton or xenon.

16. The element of claim 1, further comprising a frame formed from at least one support element having a collar part on an inner surface of the frame, the at least one support element supporting the cover glass.

17. The element of claim 16, wherein the frame further comprises a bottom part on the inner surface and a backing plate supporting heat insulation.

18. The element according to claim 17, wherein the insulation comprises mineral wool or wood fiber.

* * * * *